United States Patent [19]
Hori

[11] 3,864,183
[45] Feb. 4, 1975

[54] METHOD FOR PRODUCING PEN CORE FROM FILAMENT TOWS

[75] Inventor: Hironobu Hori, Tokyo, Japan

[73] Assignee: Tokyo Boshi Kabushiki Kaisha, Tokyo-To, Japan

[22] Filed: Nov. 21, 1972

[21] Appl. No.: 308,456

[52] U.S. Cl. ............... 156/180, 156/273, 156/274, 156/380, 156/441, 401/198
[51] Int. Cl. .................... D02j 1/00, B43k 15/00
[58] Field of Search ........... 401/198, 199; 156/180, 156/273, 274, 275, 380, 441, 330, 331

[56] References Cited
UNITED STATES PATENTS

| | | | |
|---|---|---|---|
| 2,871,911 | 2/1959 | Goldsworthy et al. | 156/380 |
| 3,400,998 | 9/1968 | Daugherty et al. | 401/198 |
| 3,442,739 | 5/1969 | Johnson | 156/180 |
| 3,556,888 | 1/1971 | Goldsworthy | 156/180 |
| 3,558,392 | 1/1971 | Goodenow et al. | 156/180 |
| 3,579,402 | 5/1971 | Goldsworthy et al. | 156/274 |
| 3,639,070 | 2/1972 | Davidson | 401/199 |

*Primary Examiner* — Daniel J. Fritsch
*Attorney, Agent, or Firm* — Wenderoth, Lind & Ponack

[57] ABSTRACT

A method of producing pen core from filament tow of synthetic resin fibers, wherein the filament tow is compression-molded under heat into a rod-shaped body, then it is immersed in a liquid synthetic resin to be impregnated, thereafter the resin-impregnated rod-shaped body is subjected to heat-treatment by a heating apparatus to solidify the resin content impregnated therewithin, and the thus treated rod-shaped body is cut into a required length and further processed for writing tip.

8 Claims, 8 Drawing Figures

METHOD FOR PRODUCING PEN CORE FROM FILAMENT TOWS

The present invention relates to a process for producing pen core (and ink reservoir) characterized in that a tow of crimped synthetic filaments is compression-molded under heat to form a rod-shaped article having a required cross sectional shape, then the rod is impregnated with a liquid synthetic resin, and, thereafter, it is introduced into a fluorine resin pipe having a bore of the same cross-sectional shape and a low dielectric constant, where it is subjected to high-frequency heating in a state of it being isolated from the external atmosphere to evaporate a solvent contained in the abovementioned liquid resin which has filled the pores among the filaments and to gel the resin content.

The objectives of the present invention are to finish the external diameter of the pen core produced from a series of production processes to be described in detail hereinafter with an extreme dimensional accuracy without subjecting it to any secondary corrective process, as well as to supply in a large quantity and varieties the pen core of an extremely steady quality which provides uniform ink flow and the least fluctuation in width of lines as drawn by the pen core, both being the most important requirements for the pens assembled from the abovementioned pen core to be used by users.

This fact means that, considering efficiency in assembling process in general, if an assembler is in a position to obtain different kinds of pen cores having steady quality and providing varieties of width of lines as drawn under the uniform dimension, the assembler can manufacture various kinds of parts necessary for assembly of the pens at a low cost and can market the finished products suitable for particular end-uses at an extremely low price and in a large quantity. Furthermore, if the pen cores are produced with their external dimension being made as accurate as that of finished metal article in general, the assembler can increase efficiency in the assembly process and minimize any possible trouble at the time of assembly as well as occurrence of inferior products, the economical advantage of which is great.

There have heretofore been known several methods for producing pen cores from filament tows. For instance, there are some issued patents in this respect such as U.S. Pat. No. 3,111,702, French Pat. No. 1,418,087, West German Pat. No. 1,511,398, U.S. Pat. No. 3,400,998, etc. However, these methods could not provide varieties of pen core having such economical advantage as mentioned above, because these manufacturing methods are still liable to cause many problems in actual processing.

More particularly, the tip hardness of a pen core, whatever size it may be, is determined by the kind of fiber, thickness of single filament, and number of the filament used for construction of the pen core as well as the kind of adhesive agent, used for bonding the filaments, hardness and adhesive strength thereof after curing, and its amount of solidification in the filaments.

Consequently, in order to vary the tip hardness of a pen core of a certain definite size using a same kind of fiber and adhesive agent, there are in general two practicable methods: the one is to increase or decrease quantity of the fiber, and the other is to increase or decrease adhering quantity of the adhesive agent.

Even if any one of the above-mentioned two methods or both of them in combination are adopted, the quantity of the pen core produced by the heretofore-known processes, particularly, the thickness of lines as drawn by it representing the tip hardness of the pen core, fluctuates to a considerable extent when the factors deciding the quality of the pen core are outside the optimum combination, as compared with the pen core produced under the optimal conditions, with the result that the pen cores for both thin writing and thick writing may happen to be coexistent in the same production lot, and their ink-flow may sometimes be non-uniform.

In the heretofore-known methods, a fiber tow is steam-treated or monofilament is adjusted for its tension, or the filament tow is spread flat so as to enable the subsequent shaping process to be carried out easily. In each method, impregnation or spraying of a liquid synthetic resin is carried out. In this case, the liquid synthetic resin adhered onto the fibers fills gaps between them. The liquid synthetic resin thus filling the gaps between the fibers is subjected to the following drying step, wherein the solid resin content in the liquid undergoes gelation accompanying reduction in the volume of the liquid in the course of evaporation of the solvent contained in the liquid. During this process, the synthetic resin liquid behaves to move toward the narrowest space gaps in the fibers in the same manner as the well-known capillary phenomenon. Also as volatilization of the solvent begins from the outer periphery of the filament tow by external heating, gelation speed of the solid resin content is different in the outer periphery and the center part of the filament tow. The gelation starts from the outer peripheral part of the filament tow, and the resin content tends to be easily concentrated to the outer periphery of the tow rather than the center part thereof. At the same time, the behavior of the filament tow is such that the filament tends to shrink by heating. Furthermore, since the filament tow at this time hangs under tension due to the aforementioned treatments to loosen the bulkiness of the filament tow and that due to the dead load thereof after having been impregnated with the resin solution, the tension of which is continuously drawn and applied to the tow as the result of such treatement, the tow stretches and shrinks easily to hinder setting of the space gap between the filament tow. As the result, the liquid resin which has saturated the filament tow moves around the space gaps in the filaments tow until such time when the solvent contained in the solution has been volatilized by heating in the drying process and the resin content therein has been gelled or cured.

Consequently, in case the fiber and the adhesive are not combined in the optimum quantity with respect to the required external dimension, the pen core produced thereform tends to be lack in uniformity, in its cross-section, particularly, in the filament density and adhesive bonding state in the center part of the pen core where the writing tip is formed, hence it becomes difficult to provide pen core having a uniform quality.

In U.S. Pat. No. 3,639,070, polyester fiber or polyamide fiber undergoes process steps of preheating, sintering, resin-impregation, drying, and curing to be formed into a rod-shaped article. The cross-section of the rod shaped body indicates that the resin adheres in layer to the peripheral portion thereof, and thickness of the resin layer is determined by the concentration of the resin used. In such method of controlling thickness of the resin layer by the concentration of the resin used, when the resin concentration exceeds a preferred limit, the flow of ink through the rod-shaped body is lowered and the writability thereof deteriorates extremely. This means that the resin concentration as specified in the claims of the US patent is the most adequate, and a resin concentration outside this specified range cannot provide a pen core having brushy-touch in writing which is the major object of this patent.

In the following, the present invention will be explained in greater detail to enable skilled persons in the art to practise it readily, while referring to several preferred embodiments and accompanying drawing, in which.

The present invention has succeeded in eliminating the above-mentioned non-uniformities in the fiber density in the center part of the cross-section of the pen core to be the writing tip as well as in the state of adhesion of the resin thereto by the process steps to be described hereinbelow, each step having proven itself to be effective for the purpose of the present invention.

More specifically, the tension of a crimped synthetic filament tow 10 is so adjusted by feed rolls 12 that no other tension than the dead load thereof is applied thereonto. This adjusement in tension will enable the filament tow to deform very naturally in accordance with the physical properties thereof at the time when the tow is deformed by external forces such as stretching, heating, compressing, or loosening.

Figure 7:
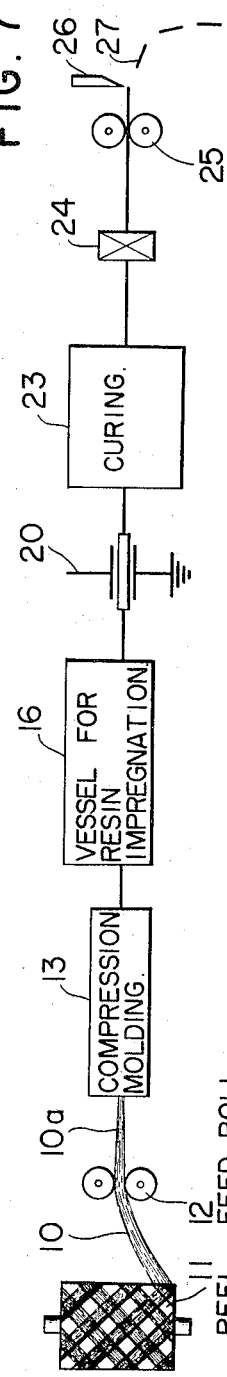
FIG. 7 is a schematic diagram showing the manufacturing steps of the pen core according to the present invention.

Kind of the synthetic fiber to be used in this invention is a tow of crimped filaments made of, for example, nylon, polyester, polyacrylonitrile, polyvinylalcohol, etc., and single filament thereof has a thickness of 2 to 10 deniers. Although the total denier of the filament tow is determined in accordance with the outer diameter of the pen core as well as its use, it usually ranges from 3,500 to 130,000 deniers. The filament tow is wound onto a bobbin (reel) 11, as shown in FIG. 7.

The thus tension-adjusted filament tow 10a is introduced into a pipe or die 14 having a bore of the same cross-sectional shape as the designed pen core and which has previously been heated by a heating block 13, in which heat-molding and compression-molding are simultaneously conducted on the filament tow. The temperature of the pipe or die 14 at this molding operation on the kind of the fibers used, it is usually set in the vicinity of ±25°C of the softening point of the fibers such as 150° to 210°C for nylon fibers, 210° to 255°C for polyester fibers, 200° to 260°C for polyacrylonitrile fibers, 200° to 260°C for polyvinylalcohol fibers, and so forth. The heating time required is 10 to 50 seconds. The material forming the pipe or die 14 is either metal, alloy, fluorine resin called polytetrafluoroethylene, polyfluoroethylenepropylene, etc.

The filament tow 15 thus molded under heat and compression, as it is compressed under heat in the vicinity of the softening point of the fibers, are intertwined each other by a mechanism similar to milling of felt, and assumes a rod-shape whose length is shorter by 5 to 15% than the original length thereof before the molding process. While distribution of filament density in the cross-section of the rod-shaped body 15 is almost uniform, there exists a slight density gradient from the outer periphery toward the center thereof, i.e., the filament density is slightly higher in the outer periphery than the center. Furthermore, drawing the rod-shaped body in a continuous manner can be carried out very smoothly, because no excessive force other than the distortional stress caused in the fiber at the time of molding and friction resistance generated by the drawing is required.

The rod-shaped body 15 is then caused to pass through a liquid resin bath 16 by way of orifices 17 and 19 having a bore same as the cross-sectional shape of the rod-shaped body 15 to impregnate the the rod-shaped body 15 with the liquid synthetic resin 18 for the necessary resin content to form required pen core. The resin content in the liquid synthetic resin 18 is selected from the range of 4 to 30 weight percent. Quality of the synthetic resin content is principally of thermosetting such as epoxy resin, urethane resin, phenolic resin, etc.. For the solvent, those which can be easily recovered and re-used and moreover have high volatilizing speed (high vapor pressure and low boiling point) such as, for example, methylene chloride, methanol, acetone, ethyl acetate, etc., to which there is added, as a heating medium for the solvent, from 1 to 5 percent by weight with respect to the total amount of the liquid resin of a polar solvent having relatively high dielectric constant and, at the same time, having a higher boiling point, but a lower volatilization speed than the above-mentioned principal solvent such as, for example, phenol and cresol containing in the molecules thereof hydroxy group, or dimethyl formamide and dimethyl acetamide containing therein a carbonyl group, and so forth.

The rod-shaped body 15 impregnated with the liquid resin upon exit from the orifice 19 is further introduced into a pipe 22 having a bore same as the cross-sectional shape of the rod-shaped body 15 and formed from a material of low dielectric constant such as polytetrafluoroethylene and polyfluoroethylene propylene, wherein it is subjected to internal heating for 10 to 50 seconds by means of dielectric high frequency heating device in a state of being shut from the external atmosphere. At this time, the rod-shaped body 15 having soaked the liquid resin generates heat due to the dielectric loss caused by internal friction loss which is mostly resulted from polarization of molecules of the dielectric substance contained in the liquid resin. When a fiber or resin having a high dielectric constant is used, such fiber or resin also generates heat. This phenomenon is called "internal heating." The rod-shaped body 15 thus heated increases its temperature almost uniformly with respect to the cross-section thereof, and the resin content in the liquid resin becomes quickly gelled, since substantially entire quantity of the principal solvent in the liquid resin which has filled or saturated the pores among the fibers volatilizes in a very short period of time.

This high frequency dielectric heating process is one of the eminent characteristic features of the present invention, whereby the solidification position of the resin content in the cross-section of the rod-shaped body 15 can be determined. More specifically, when the heat generation caused by loss of the dielectric substance is small, the gelation speed of the resin becomes slow, and the resin content solidifies in a layer at or near the outer periphery of the rod-shaped body 15, while, when the heat generation is large, the resin content concentrates on the center part of the rod-shaped body 15, and solidifies there. In this consequence, by control of the amount of heat generation, it is possible to obtain various grades of pen cores having different hardness of from soft to hard.

Figure 8:
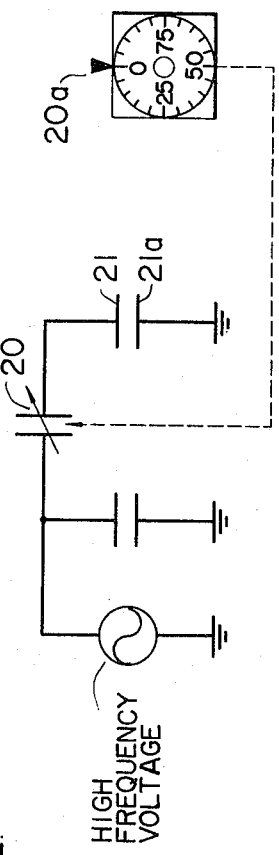
FIG. 8 is a wiring diagram for a high frequency heating device.

To accomplish the control of the amount of heat generation, there is a method as illustrated in FIG. 8 as an example. In this method, the space interval in a variable capacitor 20 is varied by turning a dial 20a for output adjustment, whereby the voltage between two electrodes 21 and 21a is varied, and, at the same time, the electric field intensity between the electrodes 21 and 21a also changes. Since the amount of load of the dielectric substance passing through the electrodes 21 and 21a is constant, the amount of heat generated by the dielectric substance can be varied by a change in the field intensity. Accordingly, various states of the resin solidification can be determined very easily by empirically setting the dial for the output adjustment.

The rod-shaped body 15, in which the resin content has gelled is further caused to pass through a hot-air dryer 23 maintained at a required temperature to cure the resin as shown in FIG. 7. In this curing process, as the fibers have previously been treated at a temperature in the vicinity of the softening point thereof, there is no apprehension of the rod-shaped body 15 deforming its shape, or changing its dimension. Furthermore, since the resin content has also gelled already, it can be cured in its state without causing flow. Consequently, the outer dimension of the rod-shaped body 15 can be finished in exactly same outer dimension as molded under heat and compression, the dimensional accuracy being therefore extremely high. The rod-shaped body 15 thus finished is further treated in the following manner depending on the purpose of use of the pen core to be produced, or when a pen core of a class having relatively small amount of resin content in the outer periphery is to be produced. That is, when a material fiber having a melting point is used in production of the rod-shaped body 15, it is passed through a die 24 heated to a temperature above the melting point of the fiber, whereby the fiber in the outer periphery of the rod-shaped body 15 melts to form a thin coating film. When a fiber having no melting point is used, the rod-shaped body 15 is caused to pass through the die 24 heated to a higher temperature than that applied for the compression-molding under heat, thereby finishing the surface of the rod-shaped body 15.

The rod-shaped body 15 subjected to the abovementioned treatment is drawn by drawing rolls 25, and cut into a required length by a cutter 26 to provide sticks 27. Subsequently, the tip end of the stick is ground into required shapes to form pen core as shown in FIGS. 1a through 5b.

According to the present invention, as the function and effect of each of the various treatment steps is clearly divided as mentioned above, it becomes possible to produce large varieties of pen cores having uniform quality depending on their uses. Those variations are listed hereinbelow.

1. Combination of properties of various kinds of fibers and various kinds of adhesives provides pen cores having different touches and appearances in writing.

2. Variations in the solidified state and solidifying quantity of an adhesive used, while maintaining the quantity of the material fiber constant, provide pen cores having different hardness from soft to hard, hence different thickness of lines from thin to thick.

3. Change in thickness and quantity of the material fiber provide pen cores having various sizes of capillaries, large and small, which permit pigment-ink containing coarse particles and dye-ink to flow through such pen cores, respectively.

4. Various combinations of different outer dimensions of the pen cores and the above factors 1 to 3 provide the pen cores in very wide varieties of assortment.

Preferred embodiments of the present invention are presented hereinbelow to illustrate the process for producing the representative pen cores according to the aforementioned combinations of the factors. It should, however, be noted that, the invention is not limited to these examples, but any cahnge and modification may be made within the spirit and scope of the invention.

EXAMPLE 1

(Process, in which hardness of a pen core having an outer diameter of 2 mm is varied, while the solid content of the adhesive is maintained constant.)

A tow of crimped nylon filaments having a total thickness of 14,500 deniers and consisting of 4-denier single filament is continuoulsy molded under heat and compression for about 20 seconds in a pipe 14 heated to and maintained at 205°C, while adjusting the tension thereof, whereby a rod-shaped body having an outer diameter of 2.10 mm is formed. The rod-shaped body is then sent through the orifice 17 into a liquid resin both where it is impregnated with a liquid resin 18 of the following recipe.

| | |
|---|---|
| Urethane resin (isocyanate + polyol) | 16 wt% |
| Meta-cresol | 2 wt% |
| Methylene chloride | 82 wt% |

The rod-shaped body impregnated with the liquid resin is introduced through the orifice 19 into the pipe 22 made of polytetrafluoro ethylene (PTFE), while care is being taken not to expose it to the external atmosphere. In this case, the orifice 19 and the PTFE pipe 22 are connected, and the pipe 22 is interposed between two electrodes 21 and 21a of a high-frequency heating apparatus. The rod-shaped body introduced into this PTFE pipe is then subjected to the interal heating for 20 seconds by adjusting the electric field intensity between the electrodes 21 and 21a. The adjustment of the field intensity can be carried out by setting the dial 20a for adjusting the output of a high-frequency heating apparatus having a frequency of 40 MHz and an output of 6 Kw on the following scales.

| | | |
|---|---|---|
| (1) | Scale | 10 |
| (2) | do. | 15 |
| (3) | do. | 20 |

Figure 1A:
FIGS. 1a through 5b are various configurations of the pen core produced according to the present invention.
Figure 1B:

Subsequently, the thus treated rod-shaped body is caused to pass through a hot-air dryer maintained at 170° C, whereby the resin content soaked in the rod-shaped body is cured. Then, the rod-shaped body is further caused to pass through a die 24 having an inner diameter of 2.00 mm and being regenerated at 265°C to form a thin coating layer of molten nylon fiber around the outer periphery thereof, and then cut into sticks of a required length. When the stick 27 thus cut is ground into a required shape of the tip, pen cores having a diameter of 2.00 (±0.05) mm are obtained as shown in FIGS. 1a and 1b.

These pen cores have different thickness of written lines depending on the adjusted field density by setting of the dial for the high-frequency heating apparatus on different scales. The relationship between the scale of the dial and thickness of the lines is as follows.

1. When the dial is placed on "10," the resin content solidifies around the outer periphery of the rod-shaped body with thickness of about 0.5 mm in the form of a hollow tube in its cross-section, whereby the lines written therewith are thick and the pen core is suitable for picture drawing.

2. When the dial is placed on "15," the resin content solidifies around the outer periphery of the rod-shaped body with thickness of about 0.7 mm in the form of a hollow tube in its cross-section, whereby the lines written therewith are of intermediate thickness between (1) above and (3) below, and the pen core is suited for writing and sketching.

3. When the dial is set on "20," the resin content uniformly disperses and solidifies throughout the rod-shaped body in its cross-section, and the lines written therewith are thin, so that the produced pen core is suitable for writing small letters and characters.

EXAMPLE 2

(Process for producing a pen core which permits pigment-ink containing coarser particles than those in dye-ink to flow therethrough)

A tow of polyester filaments having a total thickness of 20,000 deniers and consisting of single filament of 5 deniers thick is molded into a rod-shaped body having an outer diameter of 3.00 mm by the same method as in EXAMPLE 1. Subsequenty, the rod-shaped body is impregnated with a liquid resin prepared in accordance with the following recipe, and then it is treated by high-frequency heating for 50 seconds in the same manner as in EXAMPLE 1 by setting the dial 20a on the scale "20."

| Urethane resin | 4 wt% |
| Meta-cresol | 2 wt% |
| Methylene chloride | 94 wt% |

The rod-shaped body thus treated is caused to pass through a hot-air dryer to cure the resin impregnated therein, and then cut into a required length. The cut pieces are ground at one end thereof to be tapered into a tip.

Figure 5A:
Figure 5B:
Figure 6:
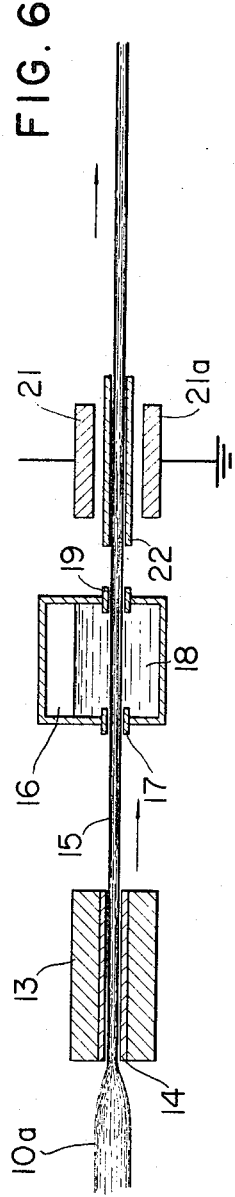
FIG. 6 is a schematic illustration of an apparatus to manufacture the pen core according to the present invention.

The pen core thus produced has an outer diameter of 3.00 (±0.05) mm, about 70 percent of porosity, and very elastic tip due to a very small amount of the resin content having uniformly dispersed and solidified throughout the cross-section of the rod-shaped body to form the pen core. Such pen core can be used as an eye-liner as shown in FIGS. 5a and 5b.

EXAMPLE 3

(Process for producing a hard pen core having an outer diameter of 1.20 mm)

A tow of crimped acrylic filaments having a total thickness of 5,200 deniers and consisting of 4-denier single filament is continuously molded under heat and compression for about 20 seconds in a pipe kept heated at 240°C, while tension thereof is being adjusted, to form a rod-shaped body of 1.20 mm outer diameter. Subsequently, the rod-shaped body is sent through the orifice into a liquid resin bath prepared in accordance with the following recipe to be impregnated with the liquid resin.

| Epoxy resin | 20 wt% |
| Dimethyl acetamide | 3 wt% |
| Methylene chloride | 77 wt% |

The rod-shaped body impregnated with the liquid resin is introduced through the orifice into the PTFE pipe interposed between the electrodes of the high-frequency heating apparatus, wherein the rod-shaped body is subjected to the internal heating for about 5 seconds, by setting the dial for controlling output of the high-frequency heating apparatus having a frequency of 40 MHz and an output of 6 Kw on the scale "20." The rod-shaped body is then caused to pass through the hot-air dryer kept heated at 180°C to cure the impregnated resin content. The thus treated rod-shaped body is cut into a required length and ground at one end thereof to be tapered into a required shape of the tip, whereby a pen core having an outer diameter of 1.20 (±0.05) mm and a hard tip capable of writing thin lines.

EXAMPLE 4

Figure 2A:
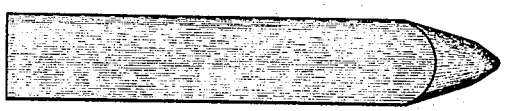
Figure 2B:
Figure 3A:
Figure 3B:
Figure 4A:
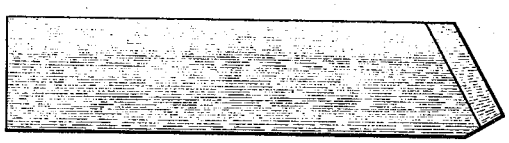
Figure 4B:
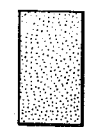

(Process for producing pen cores having different cross-sectional shapes such as shown in FIGS. 2b, 3b and 4b)

These pen cores can be manufactured in the same manner as described in EXAMPLE 2 with the exception that the various parts used in each of process steps must have an orifice of the same shape as that of the pipe used for compression molding under heat, so as not to change the shape of the pen core at the time of it being continuously drawn out from such orifice. These pipes of different shapes are readily available in the market whatever material they may be made of, such as metal, alloy, or fluorine resin, and, so far as the bore thereof is finished as designed, pen core having required shapes and sizes can be produced. The quantity and size of the capillaries in the pen core can be varied by thickness and quantity of the fibers used, and hardness of the pen core can be changed in a wide range by different concentration of the resin used as well as by the same method as mentioned in EXAMPLE 1, except for setting of the dial 20a for output control on a scale, which is dependent on thickness of the pen core to be produced, i.e., load to be applied.

What is claimed is:

1. In a method for producing pen cores from a synthetic fiber bundle, comprising the steps of subjecting a tow of synthetic fibers to compression-molding under heat to form a rod-shaped body having a predetermined cross-sectional shape, immersing said compression-molded, rod-shaped body in a liquid containing a synthetic resin and solvent therefore to impregnate the liquid into the body, subjecting said liquid impregnated rod-shaped body to a dielectric heating treatment in a high frequency electric field of an intensity sufficient to cause internal heating within the rod-shaped body to volatilize the solvent in said liquid, in a state wherein the rod-shaped body is passed through a pipe of low dielectric constant which shields the body from the external atmosphere, cutting the thus treated rod-shaped body into a required length, and shaping at least one end of the rod-shaped body to taper said end into a configuration required for a writing tip, the improvement wherein said liquid is prepared by dissolving a synthetic resin in a solvent consisting essentially of a principal solvent and a polar solvent having a high dielectric constant, a lower volatilization speed than that of said principal solvent and a higher boiling point than that of said principal solvent, said polar solvent being used as a heating medium and for generating internal heat due to dielectric loss therein during said dielectric heating treatment, to volatilize the principal solvent and to heat the rod-shaped body internally, thereby gelling the synthetic resin.

2. The method according to claim 1, in which said compression-molding under heat is carried out at a temperature within the range of 30°C above and below the softening point of the synthetic fibers used.

3. The method according to claim 1, in which said principal solvent is selected from the group consisting of methanol, acetone, and ethyl acetate, and said polar solvent is one having a boiling point of above 130°C, containing in the molecules thereof a carbonyl group, or hydroxy, and is selected from the group consisting of phenol, cresol, dimethyl formamide, and dimethyl acetamide.

4. The method according to claim 1, in which the synthetic resin is a thermo-setting resin selected from the group consisting of epoxy resin, urethane resin, and phenolic resin.

5. The method according to claim 1, in which the intensity of said high frequency electric field at the time of said dielectric heating treatment is adjusted to a preselected value to produce a corresponding amount of dielectric heat within the rod-shaped body, the state of gelation of the resin impregnated in the rod-shaped body being selectively controlled, depending upon said intensity, to one of three states, that is, (1) a state wherein said resin is gelled in a layer mainly at the outer periphery of the rod-shaped body, (2) a state wherein the resin is uniformly dispersed and gelled throughout the cross-section of the rod-shaped body, or (3) a state wherein the resin concentrates and is gelled mainly at the central part of the rod-shaped body.

6. The method according to claim 1, in which said pipe of low dielectric constant is made of polytetrafluoroethylene or polyfluoroethylenpropylene.

7. The method according to claim 1, in which said synthetic fibers are crimped and are made of a material selected from the group consisting of nylon, polyester, polyacrylonitrile and polyvinylalcohol, the thickness of a single filament ranging from 2 to 10 deniers.

8. The method according to calim 1, in which the synthetic fibers are a mixture of nylon and polyester fibers, said method further comprising curing the gelled resin contained in the rod-shaped body, and passing the thus treated rod-shaped body through an orifice which is 0.03 to 0.15 mm smaller than the diameter of the rod-shaped body while heating the rod-shaped body at a temperature higher than the melting point of said synthetic fibers, to form a thin coating film around the periphery of the rod-shaped body.

* * * * *